G. M. KENDALL.
PASTEURIZER.
APPLICATION FILED SEPT. 13, 1912.
1,070,484.
Patented Aug. 19, 1913.
3 SHEETS—SHEET 1.
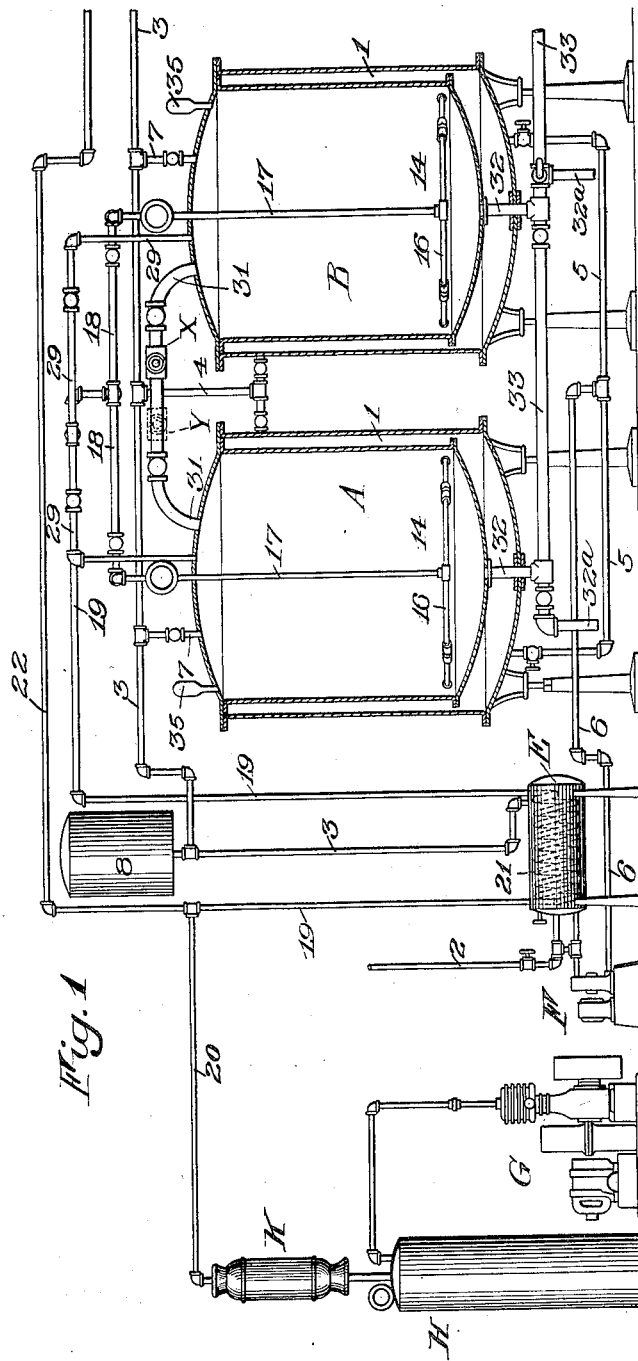
Witnesses
Walter B. Payne
Inventor
George M. Kendall
By
his Attorneys

G. M. KENDALL.
PASTEURIZER.
APPLICATION FILED SEPT. 13, 1912.

1,070,484.

Patented Aug. 19, 1913.
3 SHEETS—SHEET 2.

Inventor
George M. Kendall

Witnesses

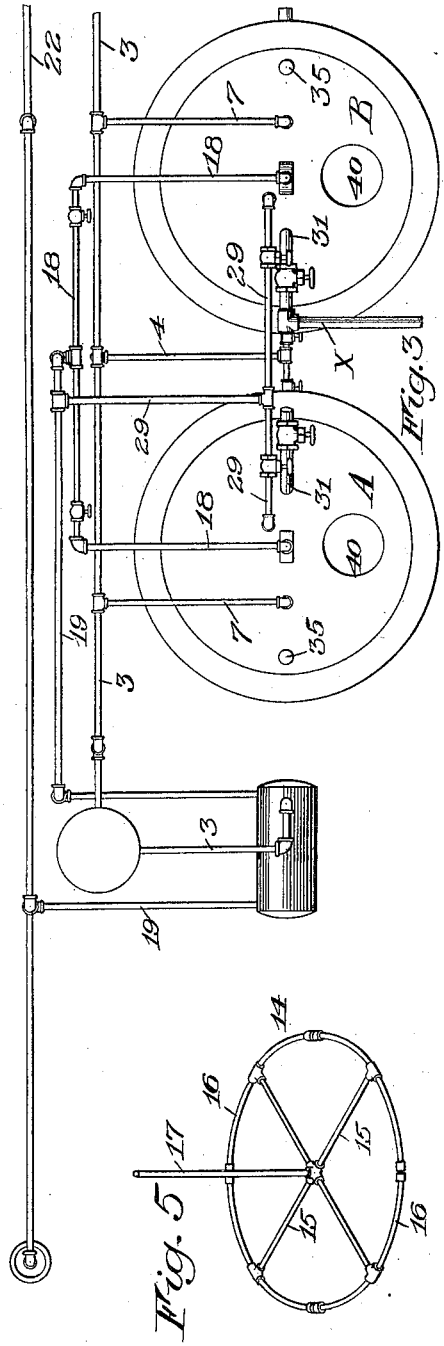

UNITED STATES PATENT OFFICE.

GEORGE M. KENDALL, OF NEW YORK, N. Y.

PASTEURIZER.

1,070,484.   Specification of Letters Patent.   Patented Aug. 19, 1913.

Application filed September 13, 1912. Serial No. 720,199.

*To all whom it may concern:*

Be it known that I, GEORGE M. KENDALL, of New York city, in the county of New York and State of New York, have invented certain new and useful Improvements in Pasteurizers; and I do hereby declare the following to be a full, clear, and exact description of the same, reference being had to the accompanying drawings, forming a part of this specification, and to the reference-numerals marked thereon.

The present invention relates to pasteurizers and more particularly to the art of pasteurizing milk and it has for its object to provide a simple and convenient apparatus in which the milk may be quickly heated without danger of burning and quickly cooled without danger of freezing, and which may be also used to store the milk at a preserving temperature either in the raw state or after being pasteurized.

A further object of the invention is to render the apparatus capable of being cleaned, those parts with which the milk comes in contact being simple in construction and adapted for easy access.

To these and other ends the invention consists in certain improvements and combinations of parts, all as will be hereinafter more fully described, the novel features being pointed out in the claims at the end of the specification.

In the drawings: Figure 1 is a side elevation, partly in section, of that portion of the apparatus in a particular embodiment of my invention, which is used for heating the milk, and showing also the sources of air and hot water supply; Fig. 2, is a similar view of the refrigerating part of the apparatus; Fig. 3 is a top plan view of the parts shown in Fig. 1; Fig. 4 is a top plan view of the parts shown in Fig. 2, and Fig. 5 is a detail perspective view of one of the agitating and aerating heads.

Similar reference numerals throughout the several figures indicate the same parts.

Referring more particularly to the drawings it is explained that Figs. 1 and 2 show opposite ends of a continuous system which is thus divided in order to enlarge the details so that the two sheets can be referred to together to advantage.

The plant illustrated as one embodiment of my invention is really of a duplicate nature in general respects to permit the simultaneous handling of two bodies of milk. To this end it comprises a pair of heating tanks A, B and a pair of cooling tanks C, D. All of these tanks may be of the same general type and are provided with jackets or mantels 1. The jackets of the heating tanks A, B are supplied with a circulating heating medium, preferably hot water, which is generated in the present instance, in a boiler E by the injection of live steam from a suitable source through a pipe 2. A suitable pump F drives the water through a supply pipe 3 and a branch T 4 into the tops of the two jackets and draws the cooler water from the bottoms of the jackets through exhaust pipes 5 and return pipe 6. Also connected with the hot water system are intake pipes leading from the feed pipe 3 to the interiors of the two heating tanks A, B and also the cooling tanks C, D by means of which the latter are flushed out and sterilized under pressure, as will be later explained, and a balancing tank 8 is stationed at a suitable point in the usual manner. Connections are provided for introducing live steam into the several tanks for sterilizing the system under steam pressure. Through the jackets 1 of the refrigerating tanks C, D, is circulated, in a similar manner, brine or any other suitable refrigerating medium, which enters the jackets through a pipe 9 connected to a supply or feed pipe 10. It is drawn off at the bottoms of the jackets through exhaust pipes 11 and 12 and back to the generator through a return pipe 13.

An aerating or agitating head, indicated generally by numeral 14 is located in the bottom of each tank and preferably comprises a plurality of radial perforated tubes 15, each connected at its extremity to the center of a segmental perforated tube 16. These segmental tubes 16, though independent, jointly constitute a practically continuous circular discharge pipe that follows the contour of the inner wall of the tank in proximity thereto so that the air delivered therefrom is inclined to traverse the surfaces heated directly by the jacket during its upward course. The agitators of the tanks A and B are connected by stems 17 to a T 18 leading from a branch air supply pipe 19 that leads from the main air supply pipe 20 through an intermediate coil 21 preferably arranged within a hot water generator E so that the air discharged from the agitator may be heated to a sterilizing temperature equal to that of the jackets 1.

An air compressor, indicated generally by G, furnishes a compressed air tank H and a suitable mechanical filter or purifier K composed of cotton fiber or any desired medium is interposed between the air tank and the feed pipe 20. Another branch 22 from the air supply pipe 20 supplies air at atmospheric temperature and which has not passed through the heater E to the agitating heads 14 of the cooling tanks C, D, but in so doing the air is first passed by pipe 23 through a refrigerating coil 24 jacketed at 25 for the circulation of brine which reaches it through a pipe 26 leading from the brine supply pipe 10. The cold air emerges at 27 and delivers to a cross pipe 28 to which the stems 17 of the refrigerating agitators are joined. A branch 29 from the hot air feed pipe 19 delivers into the top of each of the heating tanks, while branches 30 from the cold air supply pipe 22 lead into the tops of the refrigerating tanks C and D.

Describing the operation in connection with the remainder of the description, the raw milk is introduced at X, Fig. 1, and through pipe 31 discharged into either or both of the heating tanks A, B. Meanwhile the pump F and injector 2 have been placed in operation so that a circulation of hot water is set up through the jackets 1 from the generator E, which latter also heats the air from tank H through pipe 19 and coil 21 to the agitators 14. Thus while the milk is being heated by direct contact with the jacket 1 it is also being heated by the streams or bubbles of heated air forced up from the agitators, but the more important function of the latter, as the name implies, is to keep the milk in constant motion, and more particularly the moving of the milk rapidly up along the sides of the tank which increases the heating capacity of the jacket and materially decreases the time necessary to obtain the pasteurizing temperature. It is for this reason, as before pointed out, that portions of the heads are made circular and close to the walls of the tanks.

When the body or bodies of milk have reached a pasteurizing temperature of between 140° and 160° Fahrenheit, the milk is allowed to remain there for the necessary period to allow of the destruction of all the micro-organisms in accordance with the well known principles and is then transferred from the heating tanks A, B to the cooling tanks C, D by the pressure of air introduced through the pipes 29, before referred to. It will be noted that this air is filtered and sterilized so that it can impart no bacteria to the sterile milk against which it issues. The milk escapes through discharge pipes 32 at the bottoms of the tanks into a transfer pipe 33 that delivers it into the tops of the refrigerating tanks C, D. Here again the same operation of mechanical devices is repeated, except that the circulation through the jackets 1 is that of a cooling medium and the air delivered by the agitators 14 is cold instead of hot. In these tanks the milk is cooled down to a temperature of between 40 and 60 degrees Fahrenheit, and it may be indefinitely stored at such temperature until drawn off for bottling or other use.

The milk is drawn from the refrigerating tanks C, D through discharge pipes 34, or transferred between the two in either direction by transfer pipes 36. If for any reason, however, it is desired to draw off the milk from any one tank to an exterior repository instead of transferring it from one tank to another, extensions $32^a$ and $34^a$ of the discharge pipes 32 and 34, respectively, permit of this. These extensions also permit the outflow of hot water used when the tanks are flushed out, which is done by introducing the hot water from the pipe 3 through the intake pipe 7, previously described. Suitable valves are shown at the proper points to control the flow of milk, air, hot water and brine for the purpose of bringing about the results above described, but it is not believed necessary to refer to these in detail or by reference numeral.

It will be noted that while the raw milk is being heated in the tanks A, B, the heads 14, aside from performing the functions of heating and agitating, also aerate the milk with the result, among others, that any disagreeable animal odors present therein are removed. Similarly the aerating effect of the heads 14 in the refrigerating tanks C, D removes from the heated milk, during the process of cooling, any odors resulting from the heating process and notably the cooked taste that is sometimes objected to in a pasteurized product, particularly when the temperature has been inadvertently raised a little too high. To allow the escape of the air discharged through the heads 14, relief valves 35, set for a pressure of a pound or two, are provided at a suitable point on each tank.

For the purpose of storing the raw milk in a refrigerated state prior to its pasteurization an additional set of refrigerating tanks, such as those shown in Fig. 2, may be used and the milk drawn therefrom to the tanks A, B or with the exact apparatus shown the tanks C, D, may be used for this purpose and the raw milk stored therein initially and then returned thereto after being treated, as first described. In this event the transfer pipe 36, leading to the right of Fig. 2, would be connected to the pipe 31 at Y, as shown in dotted lines in Fig. 1. It is, of course, understood that with the duplicate arrangement of tanks shown two bodies of milk may be run through together, or one ahead of the other.

Though the use of the apparatus is not necessarily limited to the pasteurization of milk, it is particularly adapted for such material, as the parts are simple and readily cleaned and easy access may be had through the manholes 40, shown in Fig. 4, to the practically straight walled interiors of the various tanks for inspection and cleaning.

I claim as my invention:

1. In a pasteurizing apparatus, the combination with a liquid container having a jacket adapted to receive a temperature controlling medium, a source of such medium and connections between the latter and the jacket, of a pneumatic agitator within the container adapted to discharge streams of air through the liquid contents adjacent to the jacketed walls, a source of compressed air supply, connections between the latter and the agitator, and means for subjecting the air to the same temperature controlling medium that is introduced into the jacket prior to its arrival at the agitator.

2. In a pasteurizing apparatus, the combination with a liquid container having a jacket adapted to receive a heating medium, a source of such medium maintained at a pasteurizing temperature, and connections between the latter and the jacket, of a pneumatic agitator within the container, a source of compressed air supply, connections between the latter and the agitator, a separate connection from the air supply to the interior of the container for removing the contents by air pressure and means for heating the compressed air to a pasteurizing temperature by exposing it to the heating medium prior to its passage through either connection.

3. In a pasteurizing apparatus, the combination with a cylindrical tank, of an aerating head arranged therein and comprising a stem, a plurality of radial tubes leading therefrom and segmental but independent perforated tube sections connected to the ends of the respectively radial tubes.

GEORGE M. KENDALL.

Witnesses:
RUTH E. JACKSON,
RUDOLPH L. JACOB.

Copies of this patent may be obtained for five cents each, by addressing the "Commissioner of Patents, Washington, D. C."